United States Patent
Kim et al.

(10) Patent No.: US 10,761,309 B2
(45) Date of Patent: Sep. 1, 2020

(54) MICROSCOPE APPARATUS BASED ON LASER SCANNING AND OPERATING METHOD THEREOF

(71) Applicant: KOREA BASIC SCIENCE INSTITUTE, Daejeon (KR)

(72) Inventors: Dong Uk Kim, Daejeon (KR); Ki Soo Chang, Daejeon (KR)

(73) Assignee: Korea Basic Science Institute, Daejeon (KR)

( * ) Notice: Subject to any disclaimer, the term of this patent is extended or adjusted under 35 U.S.C. 154(b) by 0 days.

(21) Appl. No.: 16/659,655

(22) Filed: Oct. 22, 2019

(65) Prior Publication Data

US 2020/0150413 A1  May 14, 2020

(30) Foreign Application Priority Data

Nov. 9, 2018 (KR) .......... 10-2018-0137183

(51) Int. Cl.
*H04N 5/33* (2006.01)
*G02B 21/36* (2006.01)
*G02B 21/00* (2006.01)

(52) U.S. Cl.
CPC ......... *G02B 21/36* (2013.01); *G02B 21/0032* (2013.01); *H04N 5/33* (2013.01)

(58) Field of Classification Search
CPC ....... G02B 21/36; G02B 21/0032; H04N 5/33

USPC .......................................................... 348/78
See application file for complete search history.

(56) References Cited

U.S. PATENT DOCUMENTS

| 7,838,808 B1* | 11/2010 | Ake .......... G01J 1/02 250/214 R |
| 8,072,855 B2* | 12/2011 | Ueda ......... G11B 7/1275 369/116 |
| 9,631,922 B2* | 4/2017 | Bridges ............... G01B 11/002 |
| 9,959,901 B1* | 5/2018 | Miyashita .......... G11B 20/1816 |
| 2012/0038980 A1* | 2/2012 | Nakata .............. G02B 21/0052 359/389 |
| 2014/0332677 A1* | 11/2014 | Fujiwara ............... A61B 1/063 250/234 |

\* cited by examiner

*Primary Examiner* — Shan E Elahi
(74) *Attorney, Agent, or Firm* — Occhiuti & Rohlicek LLP (57) ABSTRACT

Disclosed is a laser scanning based microscope apparatus including a light source configured to output a laser signal, a scanning unit configured to scan a heating sample with a first laser signal corresponding to a portion of the output laser signal, and output an optical signal reflected from the sample by the scanning to a first detector, the first detector configured to generate a first electrical signal through the reflected optical signal, a second detector configured to generate a second electrical signal through a second laser signal corresponding to a remaining portion of the output laser signal, and a controller configured to acquire a thermal image of the sample by performing a frequency domain analysis based on the first electrical signal and a differential electrical signal.

13 Claims, 6 Drawing Sheets

MICROSCOPE APPARATUS BASED ON LASER SCANNING AND OPERATING METHOD THEREOF

CROSS-REFERENCE TO RELATED APPLICATION(S)

This application claims the benefit of Korean Patent Application No. 10-2018-0137183, filed on Nov. 9, 2018, in the Korean Intellectual Property Office, the disclosure of which is incorporated herein by reference.

BACKGROUND

1. Field of the Invention

One or more example embodiments relate to a laser scanning based microscope apparatus.

2. Description of the Related Art

Heat produced during an operation of a semiconductor device has direct effects on the device performance and the reliability. With the recent development of technology for semiconductor manufacturing process, micropatterning and three-dimensional high integration have been achieved, and thus great heat may be easily generated locally when a defect occurs in a micro pattern of a highly-integrated device. An increase in the temperature of the device by the local heat may more sensitively influence issues such as failure cause, average life-shortening, and reliability deterioration. Thus, as a demand for micro heating defect detection or position tracking in a failure analysis process of a semiconductor device increases, high-sensitivity thermal distribution measurement or thermal characteristic analysis technology is needed more.

Meanwhile, in response to the necessity of a thermal distribution measurement apparatus, thermal reflectance microscope technology that may acquire a precise thermal image with respect to submicron patterns using the principle of detecting a change in intensity of reflected light by heating of a sample has been developed.

SUMMARY

According to an aspect, there is provided a laser scanning based microscope apparatus including a light source configured to output a laser signal, a scanning unit configured to scan a heating sample with a first laser signal corresponding to a portion of the output laser signal, and output an optical signal reflected from the sample by the scanning to a first detector, the first detector configured to generate a first electrical signal through the reflected optical signal, a second detector configured to generate a second electrical signal through a second laser signal corresponding to a remaining portion of the output laser signal, and a controller configured to acquire a thermal image of the sample by performing a frequency domain analysis based on the first electrical signal and a differential electrical signal.

The differential electrical signal may correspond to a difference between the first electrical signal and the second electrical signal to which a gain is applied.

The controller may be configured to extract a direct current (DC) component by performing the frequency domain analysis based on the first electrical signal, extract a frequency component corresponding to a frequency of a signal for the heating by performing the frequency domain analysis based on the differential electrical signal, obtain an intensity variation of the reflected optical signal using the extracted DC component and the extracted frequency component, and acquire the thermal image through the obtained intensity variation.

The second detector may include a gain compensation feedback circuit.

A cutoff frequency of the gain compensation feedback circuit may be lower than a frequency of a signal applied to the sample for the heating.

The scanning unit may include a first scanner and a second scanner.

The controller may be configured to perform optical zooming through the first scanner and the second scanner to additionally alleviate noise by an angle for scanning the sample with the first laser signal and noise by an interface of the sample.

According to another aspect, there is provided an operating method of a laser scanning based microscope apparatus, the operating method including outputting a laser signal, scanning a heating sample with a first laser signal corresponding to a portion of the output laser signal, detecting an optical signal reflected from the sample by the scanning, and detecting a second laser signal corresponding to a remaining portion of the output laser signal, and acquiring a thermal image of the sample by performing a frequency domain analysis based on a first electrical signal generated through the reflected optical signal and a differential electrical signal.

The differential electrical signal may correspond to a difference between the first electrical signal and the second laser signal to which a gain is applied.

The acquiring may include extracting a DC component by performing the frequency domain analysis based on the first electrical signal, and extracting a frequency component corresponding to a frequency of a signal for the heating by performing the frequency domain analysis based on the differential electrical signal, obtaining an intensity variation of the reflected optical signal using the extracted DC component and the extracted frequency component, and acquiring the thermal image through the obtained intensity variation.

The detecting may include detecting the reflected optical signal using a first detector and detecting the second laser signal using a second detector.

The second detector may include a gain compensation feedback circuit.

A cutoff frequency of the gain compensation feedback circuit may be lower than a frequency of a signal applied to the sample for the heating.

The acquiring may include performing optical zooming to additionally alleviate noise by an angle for scanning the sample with the first laser signal and noise by an interface of the sample.

Example embodiments may remove a change in intensity of reflected light irrelevant to heating of a sample, thereby improving the sensitivity of fine heat detection.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, some example embodiments will be described in detail with reference to the accompanying drawings.

Various modifications may be made to the example embodiments. Here, the examples are not construed as limited to the disclosure and should be understood to include all changes, equivalents, and replacements within the idea and the technical scope of the disclosure.

The terminology used herein is for the purpose of describing particular embodiments only and is not intended to be limiting. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Figure 1:
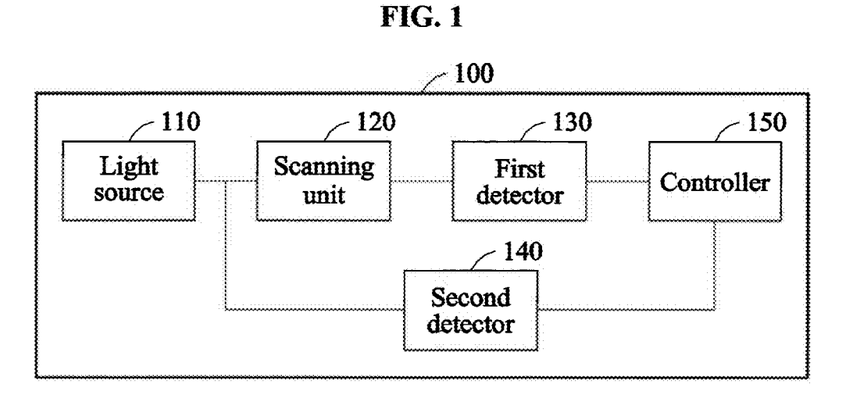
FIG. 1 is a block diagram illustrating a laser scanning based microscope apparatus according to an example embodiment.

FIG. 1 is a block diagram illustrating a laser scanning based microscope apparatus according to an example embodiment.

In the development of semiconductor devices, a thermal image distribution measurement device to be utilized for improving the device performance and the reliability through an analysis of a position and a cause of heat by measuring a distribution and a position of a small amount of heat by submicro defects may be important. While the existing laser scanning based microscope apparatus scans a sample with a laser beam, an intensity of light reflected from a sample may be changed depending on a scanning angle or a fluctuation in laser output intensity, or the intensity of the reflected light may be changed by a reflectance difference on an interface of different substances. Such a change in the intensity of the reflected light may be detected together with a change in the intensity of the reflected light caused by a change in reflectance of the sample due to a change in temperature of the sample. Thus, in the existing laser scanning based microscope apparatus, a reflected light intensity change irrelevant to heating may greatly decrease the sensitivity with respect to heating in thermal image acquisition.

The laser scanning based microscope apparatus 100 (or a high-sensitivity thermal reflectance microscope apparatus) may improve the sensitivity for micro heat detection by removing or alleviating a reflected light intensity change irrelevant to heating. The laser scanning based microscope apparatus 100 will be described in detail below.

Referring to FIG. 1, a laser scanning based microscope apparatus 100 may include a light source 110, a scanning unit 120, a first detector 130, a second detector 140, and a controller 150. The first detector 130 and the second detector 140 may correspond to separate devices which are physically distinguished, or may be logically distinguished in a device.

The light source 110 may output a laser signal. A portion of the output laser signal may be transmitted to the scanning unit 120 by a beam splitter, and a remaining portion (or the remainder) may be transmitted to the second detector 140.

The scanning unit 120 may scan a heating sample with a first laser signal corresponding to the portion of the output laser signal. The scanning unit 120 may transmit an optical signal reflected from the sample by the scanning to the first detector 130. An intensity of the reflected optical signal, that is, the reflected light, may change. Changes in the intensity may include a change in intensity of the reflected light relevant to the heating of the sample, and a change in intensity of the reflected light irrelevant to the heating of the sample.

In an example, when a predetermined signal is applied to a sample, the sample may heat. The predetermined signal may include an alternating current (AC) signal or a modulated optical signal. However, example embodiments are not limited thereto. The predetermined signal may be a signal which cause the sample to heat, and may be any signal having a frequency higher than a cutoff frequency of a gain compensation feedback circuit which will be described later.

The first detector 130 may generate a first electrical signal through the reflected optical signal.

The second detector 140 may receive a second laser signal corresponding to the remaining portion (or the remainder) of the output laser signal, generate a second electrical signal through the second laser signal, and apply a gain to the second electrical signal.

The controller 150 may acquire a thermal image of the sample by performing a frequency domain analysis based on the first electrical signal and a differential electrical signal. Here, the differential electrical signal may correspond to a difference between the first electrical signal and the second electrical signal to which the gain is applied.

The laser scanning based microscope apparatus 100 may remove the change in intensity of the reflected light irrelevant to the heating of the sample, thereby improving the sensitivity of fine heat detection. Further, the laser scanning based microscope apparatus 100 may acquire high-sensitivity thermal images with respect to various types of semiconductor devices and displays, thereby detecting local heating caused by submicro or micro defects, and tracking and analyzing positions of the submicro or the micro defects.

Figure 2:
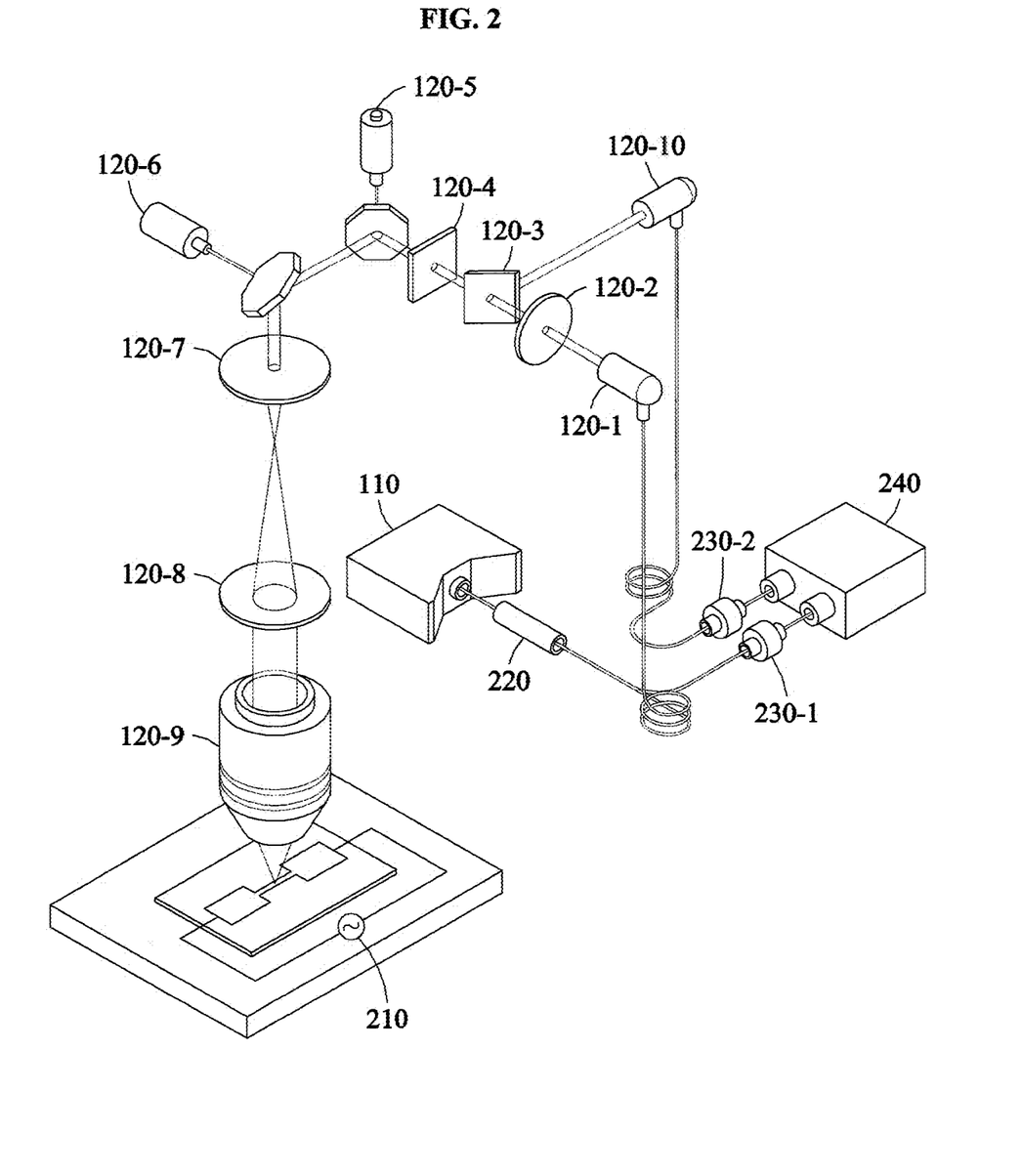
FIG. 2 illustrates a laser scanning based microscope apparatus according to an example embodiment.

FIG. 2 illustrates a laser scanning based microscope apparatus according to an example embodiment.

Referring to FIG. 2, an AC bias signal 210 may be applied to a sample. Thus, the sample may heat. In this example, a frequency of the AC bias signal 210 may be higher than a cutoff frequency of a gain compensation feedback circuit in the second detector 140.

The light source 110 may output a laser signal.

A first laser signal corresponding to a portion of the output laser signal may be transmitted to the scanning unit 120 by a beam splitter 220. The remainder of the output laser signal may pass through a variable optical attenuator 230-1 by the beam splitter 220, and a second laser signal corresponding to the remaining portion may be transmitted to the second detector 140 in a light receiver 240. The second detector 140 may detect the remaining portion of the output laser signal.

In the example of FIG. 2, the scanning unit 120 may include a collimator 120-1, a polarizer 120-2 (for example, a linear polarizer), a polarization beam splitter 120-3, a λ/4 wave plate 120-4, a first scanner (also referred to as a y-scanner) 120-5, a second scanner (also referred to as an x-scanner) 120-6, a scan lens 120-7, a tube lens 120-8, an objective lens 120-9, and a collimator 120-10.

The scanning unit 120 may scan the sample with the first laser signal through the collimator 120-1, the polarizer 120-2, the polarization beam splitter 120-3, the λ/4 wave plate 120-4, a mirror of the first scanner 120-5, a mirror of the second scanner 120-6, the scan lens 120-7, the tube lens 120-8, and the objective lens 120-9. An optical signal may be reflected from the sample by the scanning. The optical signal reflected from the sample, that is, the reflected light, may include reflectance variation signals by an intensity fluctuation of the first laser signal, a scanning angle, and an interface of the sample, in addition to a reflectance variation signal modulated with a frequency identical to that of the AC bias signal 210. In detail, as described above, the sample may heat in response to the AC bias signal 210, and thus an intensity change (or a reflectance change) of the optical signal reflected from the sample may occur at the frequency identical to that of the AC bias signal 210. In other words, the optical signal reflected from the sample may be modulated with the frequency identical to that of the AC bias signal 210. In addition, the intensity change (or the reflectance change) of the reflected light may be caused by the intensity fluctuation of the first laser signal, the scanning angle, and the interface of the sample. Thus, the reflected light may include the reflectance variation signal modulated with the frequency identical to that of the AC bias signal 210, and signals generated by a cause other than the heating of the sample.

The optical signal reflected from the sample, that is, the reflected light, may be transmitted to the first detector 130 in the light receiver 240 through the objective lens 120-9, the tube lens 120-8, the scan lens 120-7, the mirror of the second scanner 120-6, the mirror of the first scanner 120-5, the λ/4 wave plate 120-4, the polarization beam splitter 120-3, the collimator 120-10, and a variable optical attenuator 230-2.

The first detector 130 may generate a first electrical signal (for example, a current signal or a voltage signal) through the reflected light of the sample, and output the generated first electrical signal.

The second detector 140 may generate a second electrical signal through the second laser signal, and output the generated second electrical signal.

The second detector 140 may include a gain compensation feedback circuit, which is configured to adjust a gain ($g \leq 1$) and thereby maintain balance such that there is no difference between an output of the first detector 130 and an output of the second detector 140. Thus, electrical signals corresponding to frequency components greater than or equal to the cutoff frequency of the gain compensation feedback circuit may be input into the controller 150. Among reflected light intensity change signals irrelevant to the heating of the sample, a reflected light intensity change signal having a frequency lower than the cutoff frequency and being irrelevant to the heating of the sample may be removed by the second detector 140. In other words, the second detector 140 may offset the noise described above by adjusting the gain in response to an intensity fluctuation of a laser output less than the cutoff frequency of the gain compensation feedback circuit, a scanning angle change, and a reflected light intensity change by each interface of the sample.

Operation of the first detector 130, the second detector 140, and the controller 150 will be described with reference to FIG. 3.

Figure 3:
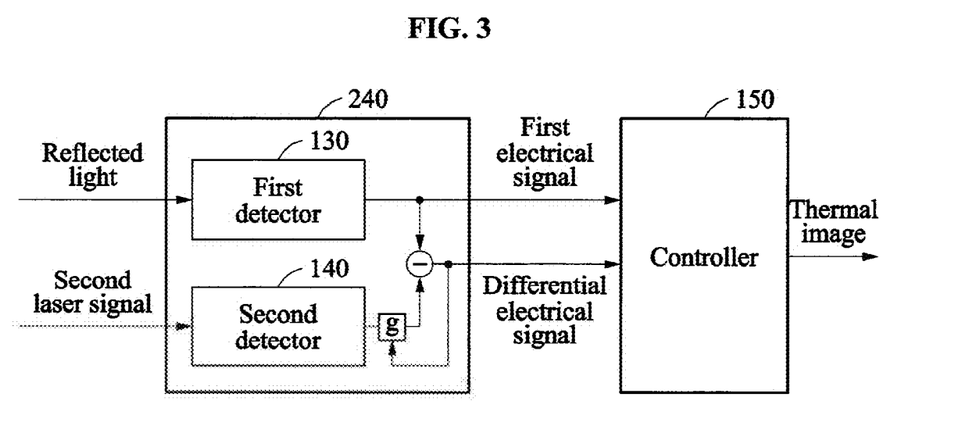
FIG. 3 illustrates an example of acquiring a thermal image by a laser scanning based microscope apparatus according to an example embodiment.

FIG. 3 illustrates an example of acquiring a thermal image by a laser scanning based microscope apparatus according to an example embodiment.

Referring to FIG. 3, a reflected light may be transmitted to the first detector 130, and a second laser signal may be transmitted to the second detector 140. The reflected light may be an optical signal reflected from a sample. As described above, the reflected light may include reflected light intensity change signals by an intensity fluctuation of a first laser signal, a scanning angle change, and an interface of the sample.

The first detector 130 may generate a first electrical signal (for example, a current signal or a voltage signal) through the reflected light, and output the first electrical signal.

The second detector 140 may generate a second electrical signal through the second laser signal, apply a gain to the second electrical signal, and output the second electrical signal to which the gain is applied.

The light receiver 240 may output the first electrical signal to the controller 150. Further, the light receiver 240 may output, to the controller 150, a differential electrical signal (for example, a voltage signal or a current signal) corresponding to a difference between the first electrical signal and the second electrical signal to which the gain is applied. In this example, the differential electrical signal may include no noise irrelevant to the heating of the sample. In an example, the differential electrical signal may be $I_S - g \cdot I_R$. Here, $I_S$ may denote the current signal output to the first detector 130, $I_R$ may denote the current signal generated by the second detector 140, and g may correspond to the gain.

The controller 150 may receive the first electrical signal and differential electrical signal from the light receiver 240. In an example, the controller 150 may perform optical zooming through the first scanner 120-5 and the second scanner 120-6 and thus, acquire a thermal image by zooming in a region of interest. An actual scan region on the sample corresponding to pixels of the thermal image zoomed-in through optical zooming may be reduced. Thus, light reflected to a more proximate region may be detected through the first detector, and the first electrical signal may be output and indicated by the controller 150 with values in pixels corresponding to the region through signal processing together with the differential electrical signal. When the zoomed-in thermal image is acquired using optical zooming under the same image acquisition conditions (for example, the number of pixels of an image, and a scanning rate), a smaller region may be scanned during a pixel dwell time. Thus, the amplitude of high-frequency components of reflected light intensity change signals by the interface of the sample and the scanning angle change, among first electrical signals, may decrease, whereby noise may be additionally alleviated.

The controller 150 may extract a direct current (DC) component by performing a frequency domain analysis based on the first electrical signal, and extract a frequency component corresponding to a frequency of an AC bias signal 210 by performing a frequency domain analysis based on the differential electrical signal. For example, the controller 150 may convert the first electrical signal into a digital signal, apply a fast Fourier transform (FFT) to the digital signal, and extract the DC component from a result of the FFT. Further, the controller 150 may convert the differential electrical signal into a digital signal, apply an FFT to the digital signal, and extract the frequency component corresponding to the frequency of the AC bias signal 210 from a result of the FFT.

The controller 150 may obtain an intensity variation (or a reflectance variation) of the reflected light using the extracted DC component and the extracted frequency component. The obtained intensity variation (or the obtained reflectance variation) may be, for example, $\Delta R_f/R_{DC}$. Here, $R_{DC}$ denotes the extracted DC component (that is, an intensity of the reflected light), and $\Delta R_f$ denotes the extracted frequency component (that is, the reflected light intensity variation (or the reflectance variation) at the frequency of the AC bias signal 210).

The controller 150 may acquire the thermal image of the sample by successively indicating intensity variations obtained in each scan region using values of pixels corresponding to the scan region.

Figure 4A:
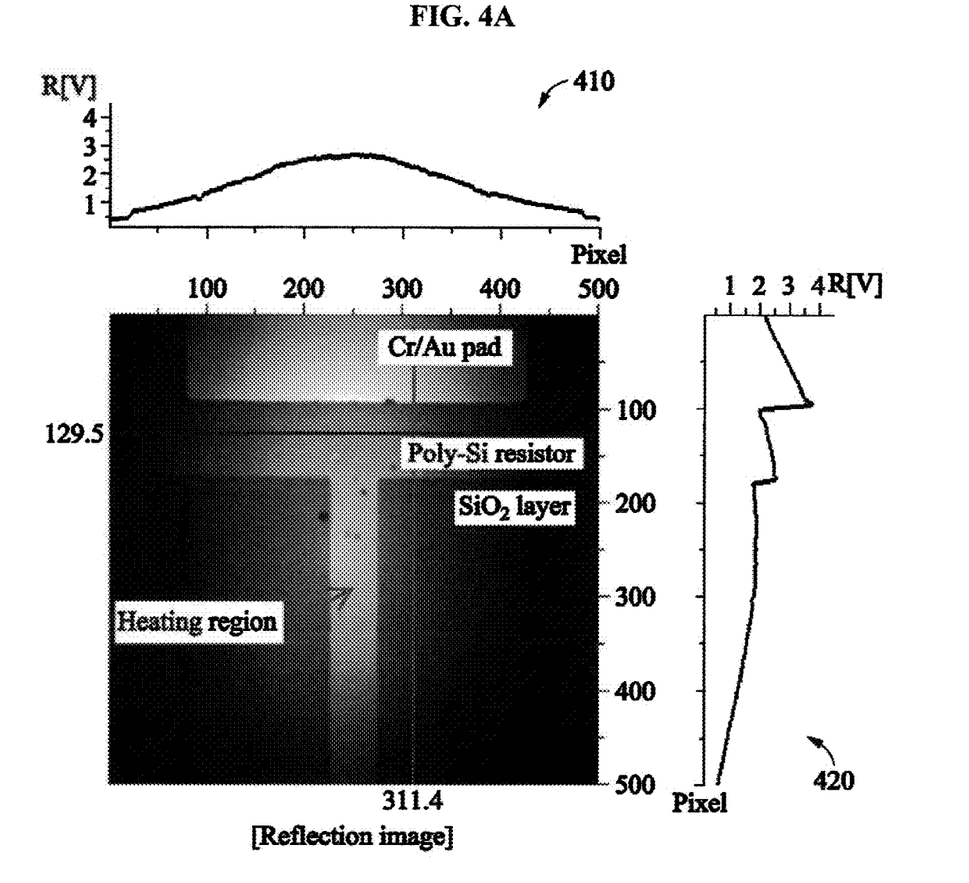
FIG. 4A illustrates a variation in intensity of reflected light irrelevant to heating.

FIG. 4A illustrates a variation in intensity of reflected light irrelevant to heating of a sample.

Referring to FIG. 4A, a reflected light intensity variation irrelevant to heating of a sample is illustrated. As described above, a reflected light intensity variation by an intensity fluctuation of a laser output, a reflected light intensity variation by a scanning angle change, and a reflected light intensity variation on an interface of a sample material may appear.

In particular, in FIG. 4A, a graph 410 shows the reflected light intensity variation by the scanning angle change, and a graph 420 shows the reflected light intensity variation on the interface of the sample material.

The reflected light intensity variation irrelevant to the heating of the sample may appear as noise in the thermal image of the sample.

Figure 4B:
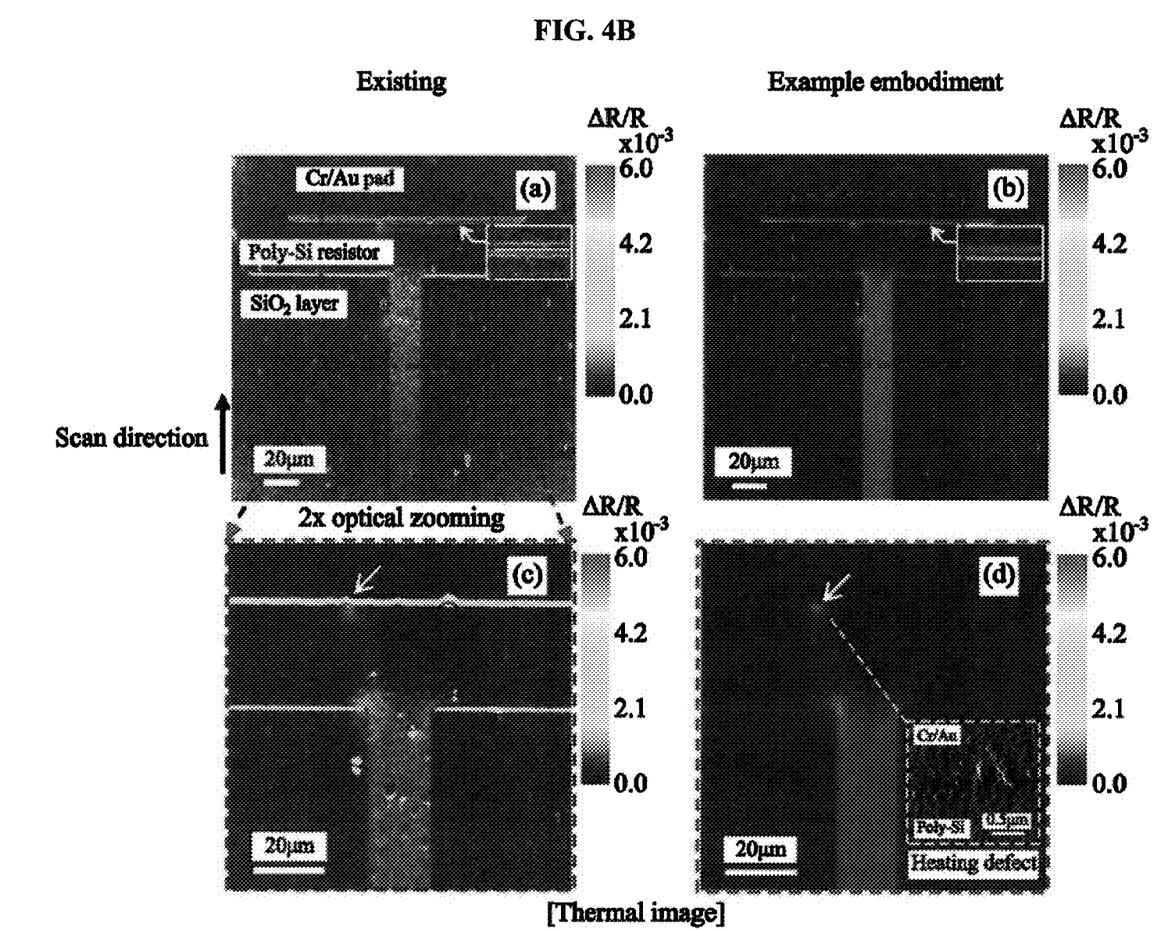
FIG. 4B illustrates a thermal image acquired by an existing laser scanning based microscope apparatus and a thermal image acquired by a laser scanning based microscope apparatus according to an example embodiment.

FIG. 4B illustrates a thermal image acquired by an existing laser scanning based microscope apparatus and a thermal image acquired by a laser scanning based microscope apparatus according to an example embodiment.

Referring to FIG. 4B, (a) is a thermal image acquired by an existing laser scanning based microscope apparatus, and (c) is a portion of (a) zoomed-in through optical zooming. (b) is a thermal image acquired by the laser scanning based microscope apparatus 100, and (d) is a portion of (b) zoomed-in through optical zooming. The thermal images (a) and (c) show a reflected light intensity change irrelevant to heating of a sample, and the thermal images (b) and (d) show no or a reduced reflected light intensity change irrelevant to the heating of the sample. That is, in the thermal images (b) and (d), noise by a fluctuation of a first laser signal, noise by an angle of scanning the sample with the first laser signal, and noise by an interface of the sample may be removed or alleviated.

Further, as shown in the thermal images (b) and (d), the laser scanning based microscope apparatus 100 may additionally alleviate the noise through optical zooming.

Figure 5:
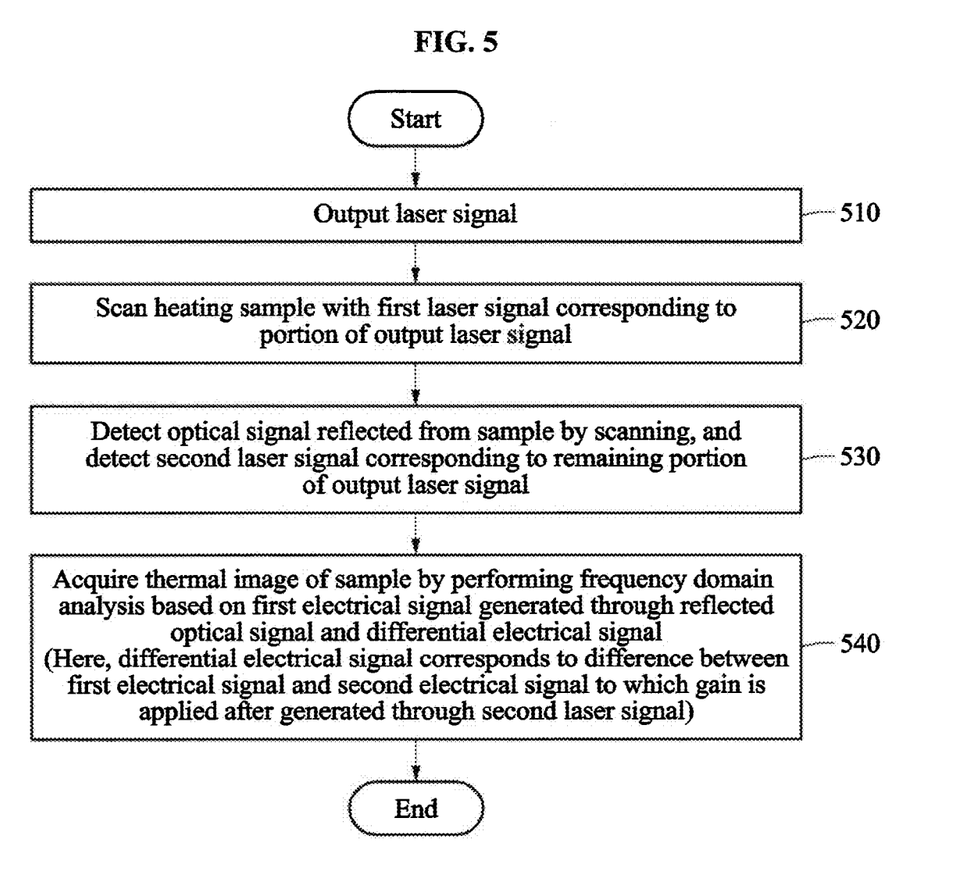
FIG. 5 is a flowchart illustrating an operating method of a laser scanning based microscope apparatus according to an example embodiment.

FIG. 5 is a flowchart illustrating an operating method of a laser scanning based microscope apparatus according to an example embodiment.

Referring to FIG. 5, in operation 510, the laser scanning based microscope apparatus 100 may output a laser signal. As described above, the laser scanning based microscope apparatus 100 may also referred to as a high-sensitivity thermal reflectance microscope apparatus.

In operation 520, the laser scanning based microscope apparatus 100 may scan a heating sample with a first laser signal corresponding to a portion of the output laser signal. The sample may heat in response to a predetermined signal (for example, the AC signal or optical signal described above) being applied thereto.

In operation 530, the laser scanning based microscope apparatus 100 may detect an optical signal reflected from the sample by the scanning, and detect a second laser signal corresponding to a remaining portion of the output laser signal.

In operation 540, the laser scanning based microscope apparatus 100 may acquire a thermal image of the sample by performing a frequency domain analysis based on a first electrical signal generated through the reflected optical signal and a differential electrical signal. Here, the differential electrical signal may correspond to a difference between the first electrical signal and a second electrical signal to which a gain is applied after generated through the second laser signal.

In operation 540, the laser scanning based microscope apparatus 100 may extract a DC component by performing the frequency domain analysis based on the first electrical signal, and extract a frequency component by performing the frequency domain analysis based on the differential electrical signal. Here, the extracted frequency component may correspond to a frequency of the predetermined signal applied for the heating of the sample. The laser scanning based microscope apparatus 100 may obtain an intensity variation of the reflected optical signal using the extracted DC component and the extracted frequency component, and acquire the thermal image of the sample through the obtained intensity variation.

The laser scanning based microscope apparatus 100 may acquire a thermal image in which noise by an intensity fluctuation of the first laser signal, noise by an angle for scanning the sample with the first laser signal, and noise by an interface of the sample are removed or alleviated. Further, the laser scanning based microscope apparatus 100 may perform optical zooming to additionally alleviate the noise by the angle for scanning the sample with the first laser signal and the noise by the interface of the sample.

The description provided through FIGS. 1 through 4B may apply to the description provided through FIG. 5, and thus duplicate description will be omitted for conciseness.

The units described herein may be implemented using a hardware component, a software component and/or a combination thereof. A processing device may be implemented using one or more general-purpose or special purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A laser scanning based microscope apparatus, comprising:
    a light source configured to output a laser signal;
    a scanning unit configured to scan a heating sample with a first laser signal corresponding to a portion of the output laser signal, and output an optical signal reflected from the sample by the scanning to a first detector;
    the first detector configured to generate a first electrical signal through the reflected optical signal;
    a second detector configured to generate a second electrical signal through a second laser signal corresponding to a remaining portion of the output laser signal; and
    a controller configured to acquire a thermal image of the sample by performing a frequency domain analysis based on the first electrical signal and a differential electrical signal,
    wherein the differential electrical signal corresponds to a difference between the first electrical signal and the second electrical signal to which a gain is applied.

2. The laser scanning based microscope apparatus of claim 1, wherein the controller is configured to extract a direct current (DC) component by performing the frequency domain analysis based on the first electrical signal, extract a frequency component corresponding to a frequency of a signal for the heating by performing the frequency domain analysis based on the differential electrical signal, obtain an intensity variation of the reflected optical signal using the extracted DC component and the extracted frequency component, and acquire the thermal image through the obtained intensity variation.

3. The laser scanning based microscope apparatus of claim 1, wherein the second detector comprises a gain compensation feedback circuit.

4. The laser scanning based microscope apparatus of claim 3, wherein a cutoff frequency of the gain compensation feedback circuit is lower than a frequency of a signal applied to the sample for the heating.

5. The laser scanning based microscope apparatus of claim 1, wherein the acquired thermal image is a thermal image in which noise by an intensity fluctuation of the first laser signal, noise by an angle for scanning the sample with the first laser signal, and noise by an interface of the sample are removed or alleviated.

6. The laser scanning based microscope apparatus of claim 1, wherein the scanning unit comprises a first scanner and a second scanner, and
    the controller is configured to perform optical zooming through the first scanner and the second scanner to additionally alleviate noise by an angle for scanning the sample with the first laser signal and noise by an interface of the sample.

7. An operating method of a laser scanning based microscope apparatus, the operating method comprising:
    outputting a laser signal;
    scanning a heating sample with a first laser signal corresponding to a portion of the output laser signal;
    detecting an optical signal reflected from the sample by the scanning, and detecting a second laser signal corresponding to a remaining portion of the output laser signal; and
    acquiring a thermal image of the sample by performing a frequency domain analysis based on a first electrical signal generated through the reflected optical signal and a differential electrical signal,
    wherein the differential electrical signal corresponds to a difference between the first electrical signal and the second laser signal to which a gain is applied.

8. The operating method of claim 7, wherein the acquiring comprises:
   extracting a direct current (DC) component by performing the frequency domain analysis based on the first electrical signal, and extracting a frequency component corresponding to a frequency of a signal for the heating by performing the frequency domain analysis based on the differential electrical signal;
   obtaining an intensity variation of the reflected optical signal using the extracted DC component and the extracted frequency component; and
   acquiring the thermal image through the obtained intensity variation.

9. The operating method of claim 7, wherein the detecting comprises detecting the reflected optical signal using a first detector and detecting the second laser signal using a second detector.

10. The operating method of claim 9, wherein the second detector comprises a gain compensation feedback circuit.

11. The operating method of claim 10, wherein a cutoff frequency of the gain compensation feedback circuit is lower than a frequency of a signal applied to the sample for the heating.

12. The operating method of claim 7, wherein the acquired thermal image is a thermal image in which noise by an intensity fluctuation of the first laser signal, noise by an angle for scanning the sample with the first laser signal, and noise by an interface of the sample are removed or alleviated.

13. The operating method of claim 7, wherein the acquiring comprises performing optical zooming to additionally alleviate noise by an angle for scanning the sample with the first laser signal and noise by an interface of the sample.

* * * * *